United States Patent

Cook

[15] 3,652,305

[45] Mar. 28, 1972

[54] MOLDABLE HYDRATED MAGNESIUM OXIDE AND THE FORMATION OF MOLDED ARTICLES THEREFROM

[72] Inventor: Thomas E. Cook, 3570 Maize Road, Columbus, Ohio 43224

[22] Filed: Feb. 24, 1970

[21] Appl. No.: 13,759

[52] U.S. Cl. ................................106/58, 106/62, 106/105, 106/121
[51] Int. Cl. ..........................................C04b 35/04
[58] Field of Search......................106/62, 58, 105, 121, 314

[56] References Cited

FOREIGN PATENTS OR APPLICATIONS 471,820  2/1951  Canada...................................106/105
1,114,138  9/1961  Germany................................106/105

Primary Examiner—James E. Poer
Attorney—Mahoney, Miller & Stebens

[57] ABSTRACT

A moldable hydrated magnesium oxide and a method of preparing various articles from such material with vitreous surfaces. The material consists mainly of magnesium oxide, ammonium persulfate which acts as a mineralizing agent, and fillers such as aluminum oxide and fine aggregate. When properly combined and formed into a slurry, the mixture can be poured or injected into a mold or extruded and cured at an elevated temperature to form desired articles which will have vitreous or glassy surfaces. A polar organic compound of the glycol or glycol ether class, which functions both as a wetting agent and a protective colloid, is also preferably used in forming the slurry.

5 Claims, No Drawings

MOLDABLE HYDRATED MAGNESIUM OXIDE AND THE FORMATION OF MOLDED ARTICLES THEREFROM

According to my invention, a liquid phase consisting of an aqueous solution of ammonium persulfate and a glycol ether can be processed with a solid mixture of magnesium oxide, aluminum oxide and sand to yield a heat curing cement having a dense vitreous surface and desired electrical phenomena.

The product which results from the processing of a mixture of magnesium oxides with other oxides according to my invention, in the manner to be described, is a molded or cast object having a core of chemically bonded oxides of variable composition, which resembles Portland center concrete in appearance, and a highly insoluble, dense, vitreous appearing shell or casing.

The mixture to be processed is alkaline, as measured by the hydrogen ion concentration and can be induced to set to a hard mass which is slightly soluble in water and hydrolyses to a PH of 9 or greater. Changes in the composition or the processing conditions can cause the surface to become translucent and have a greasy or waxy nature or to have a glassy appearance.

Compositions and processing conditions can be chosen to cause the glassy surface to show a neutral reaction to moist litmus paper or to Neutral Red indicator solution.

While the various types of cured objects produced according to this invention may find useful specialized applications, the principal advantageous characteristics thereof result from the vitreous, water-resistant, chemically neutral surface which is formed on the molded objects. The material is useful in producing wall or floor tile where dense waterproof and somewhat resilient surfaces are desirable, other building products, electrical products, refractory products, fire-resistant products, etc.

The material is prepared by adding a mixture of magnesium oxides with other oxides to a prepared solution while stirring or mixing the solution. The resulting slurry is stirred throughly, placed in a mold, sealed and cured in a low temperature oven.

An investigation of the system $MgO-H_2O-(NH_4)_2S_2O_8$ was made in accordance with my invention. The purpose of the initial tests was to determine if an improvement in the strength of a magnesium oxysulfate cement, which had followed foaming with dilute hydrogen peroxide, was due in any way to the oxidizing agent or simply caused by (1) surface tensile forces in film walls, (2) sheer stress mixing in expanding bubble boundaries, or (3) vaporization of excess water by exothermic reaction heat.

In this investigation during one test, a slurry consisting of 25 grams of ammonium persulfate, 300 ml. of tap water, and 360 grams of active magnesium oxide was made and allowed to settle overnight in a sealed container. The slurry solidified during this time, leaving about 7 ml. of clear supernatant liquor. Chunks of the solid mass were removed by chipping and stored in a covered (but not gastight) vessel. The solids reached maximum hardness in about two weeks of storage in the weak ammonia atmosphere. Subsequent prolonged soaking in water did not weaken the cement.

In another test, an $H_2O-MgO$ slurry was held at 160° F. for 2 hours. 40 grams of the slurry was reacted with 10 grams of ammonium persulfate. After the reaction heat was dissipated, separate portions of the mixture were thickened with (1) 80 × 200 mesh aluminum oxide powder, and (2) siliceous fine aggregate. Both samples were lightly covered and kept moist for 7 days. Either the sand or alumina was found to improve the weight strength of the cured sample. In addition, the surface of the sand-filled sample which had been in contact with the aluminum sample boat became translucent and amorphous appearing. These results, together with control tests, are shown in Table 1.

A series of tests confirmed the unique changes deriving from the incorporation of sand in the formula and showed that oxdiethanol improved the workability of thick pasty mixtures. Tests 1021-1 and 1021-2 also established that the glycol ether helps prevent reaction with the aluminum mold material and stabilizes the solids suspension at the temperatures used in oven curing.

TABLE 1.—EXPLORATORY TESTS

| Test No.: | Master Batch | Additive | Results | Remarks |
|---|---|---|---|---|
| 916-1 | $MgO-H_2O$ | None | Poor | 130° F. cure. |
| 916-2 | $MgO-H_2O$ | $Al_2O_3$ & APS | Good wet strength | 7 day cure, opaque. |
| 916-3 | $MgO-H_2O$ | Sand | do | 7 day cure, transluscent. |
| 916-4 | $MgO-H_2O$ | Eps. Salt | Fair wet strength | 7 day cure, effloresces. |
| 916-5 | $MgO-H_2O$ | APS | do | 7 day cure, opaque. |

TABLE 2.—PROCEDURE DEVELOPMENT

| Test No.: | $H_2O$ | APS | ODE | MgO | Sand | Added last | Comments |
|---|---|---|---|---|---|---|---|
| 1021-1 | 20 | 10 | 0 | 30 | 60 | Sand | Poor. |
| 1021-2 | 20 | 10 | 3 | 30 | 60 | ODE | Fair. |
| 1023-1 | 20 | 10 | 3 | 30 | 60 | MgO | Very good. |
| 1031-1 | 20 | 10 | 3 | 30 | 60 | APS | Poor. |
| 1033-B | 20 | 5 | 1 3 | 40 | 60 | MgO | Best of group. |
| 1103-1 | 20 | 5 | 3 | 45 | 60 | MgO | V. good, too thick for blending. |
| 1217-A [2] | 40 | 10 | 6 | 70 | 10 | MgO | Good. |
| 1218-1 [2] | 40 | 10 | 6 | 80 | 10 | MgO | Poor (acidified with 1 gm. $H_2SC_4$). |

[1] Oxydipropanol substituted for CDE.
[2] Processed at 120° F.

TABLE 3.—EFFECT OF ELECTRICAL GROUND

| Test No.: | $H_2O$ | ODE | APS | Sand | MgO | Variable | Results |
|---|---|---|---|---|---|---|---|
| 112-A1 | 20 | 3 | 5 | 60 | 40 | Grounded alum | Impeller best surface. |
| 112-B | 30 | 4.5 | 7.5 | 90 | 60 | Insulated alum | Impeller waxy. |
| 113-C | 30 | 4.5 | 7.5 | 90 | 60 | Acrylic painted | Do. |
| 114-A2 | 30 | 4.5 | 7.5 | 90 | 60 | Repeat of Al | Not as good as Al. |
| 130-D | 30 | 4.5 | 7.5 | 90 | 60 | do | Better than Al. |
| 128-1 | 50 | 7.5 | 12.0 | 150 | 100 | (1) | (2). |

[1] Alum. Impeller, SS steel vessel Short-circuited cell.
[2] Too stiff for mixing. Product gray color translucent.

It was also discovered that decomposition of the reagent ammonium persulfate which takes place on extended exposure to ambient air, was one of the causes of lack of reproducibility in the tests. It is assumed that the decomposition products are $(NH_4)_2SO_4$ and free acid. Samples having poor wet strength may frequently be traced to the presence of sulfate ion in the processing solution.

Despite the variability in composition of the raw materials, the investigation revealed the essential features of a usable process. Based on these results, the liquid phase used in most of the study consisted of 72 percent water, 10 percent oxydiethanol, and 18 percent ammonium persulfate. Oxdipropanol was later found to be more effective than oxydiethanol. These solute concentrations are closer to the upper than to the lower limits for satisfactory processing and may be varied without significantly affecting the results.

The total solids to liquid ratio was used as a variable while keeping the weight ratio of calcined magnesia to water at 2:1. This provided initial molar excess of water for the compound Mg(OH)$_2$ of 25 to 30 percent. Cured and dried cement contained about 0.9 moles of water per mole of MgO.

Processing techniques and compositions were evaluated and compared after curing for 48 hours at 110° F., although other times and temperatures were included in the curing study. The test samples were sealed in aluminum foil for curing.

Some of the preliminary development tests are summarized in Table 2.

Mixing

The fundamental procedure requires that the sand (which was highly calcareous) be added to a freshly prepared solution of ammonium persulfate and oxydipropanol or oxydiethanol in water and stirred for fifteen minutes. The originally slightly acid solution becomes neutral at this stage, and insoluble CaSO$_4$ is probably formed. Calcined magnesia is added to the sand slurry while stirring. After the addition is completed, the mixing vessel is sealed to maintain an ammonia atmosphere in equilibrium with the ammonium hydroxide formed by hydrolysis, and stirring is continued for 45 minutes to facilitate degassing.

An extensive investigation of the electrical phenomena involved in densification was not made, but the data which were gathered indicates that the transformation in chemical and physical properties is not caused by local cell reactions with aluminum metal, but more likely is due to a "bleeding off" of electrons. This conclusion is partly based on the data given in Table 3. The connection of an electrical conductor between the aluminum mixing impeller and ground was made a part of the standard mixing procedure.

Curing

Air dried samples lose moisture very rapidly and reach a moderately strong set state in a few hours. The hardness increases with time and maximum strength is attained in three to four weeks. The physical appearance of air set cement is similar to that of a gypsum plaster. The samples contain soluble salt and are weakened by soaking in water.

Loss of water on air drying is accompanied by flocculation into rounded aggregates. When the rapid water loss is prevented by curing the cement in a sealed mold, the liquid-solid interfacial tension is greater than the cohesive interparticle forces and densification takes place at the surface. The rate of formation of an apparently amorphous compound is time-temperature dependent and requires a conductive or electrostatically charged surface.

The range of temperatures investigated in the cure studies was from 75° to 130° F. The upper temperature limit for curing is dependent on the composition of the mixture under test.

Excess water favors an exothermic hydration reaction which overheats the sample and coagulates the solids, leaving large void spaces. The peak temperature can be moderated by (1) lowering the ratio of water to MgO to as near stoichiometric as possible consistent with workability, (2) increasing non-MgO solids to absorb excess water and provide mass for heat absorption, (3) Curing on massive heat absorbing slab, and (4) increasing surface to volume ratio of the sample.

The amorphous or gel-like structure will also form at room temperature, but transformation time is up to ten days. The surface can be scratched easily (similar to celuloid) and is usually coated with submicrospic particles. The cloudy surface coating behaves like a wax and can be buffed to a high polish. The lubricity of the film might indicate formation of a platy or talc-like compound.

The most transparent, hard, glassy surfaces are developed at the highest temperature consistent with the batch formulation.

BATCH COMPOSITION

The evidence that a glazed surface will form when an impure sand is reacted with the gaging solution before the addition of magnesia was cause for an attempt to identify the responsible constituent. The most probable material, silica, was added in the form of −200 mesh flint, and as colloidal silica (Cab-O-Sil). Tennessee Ball clay was used to introduce a complex silicate, and ground Calcite was used to increase the proportion of CaCO$_3$ in the batch. Aluminum oxide had already been found to improve the wet strength (Table 1, Test 916–2) and −80 mesh reagent grade powder was the material employed.

Partial Substitution

The problems inherent in making radical departures from a workable process were avoided by screening the effect of the new components when used as replacements for a small fraction of the original formula. Promising tests could then be used as the basis for a new series of formulations covering a wider range of additive. The test data is summarized in Table 4.

In the amounts used, quartz and calcite can be considered neutral in their effects, as the results were inseperable from the standard sand-MgO cement. The Cab-O-Sil and the finely divided clay increased the viscosity of the slurry to the extent that the results could not be compared directly to other samples in the group. It was noted that the sample containing colloidal silica developed in a tough, smooth surface which was not vitreous appearing. A test in which potassium persulfate replaced part of the ammonium persulfate gave very good results, indicating that the concentration of NH$_3$ is above the minimum required.

The physical appearance of samples containing about 5 percent of Al$_2$O$_3$ did not differ appreciably from standard samples, but a chemical test revealed that there is a significant reduction in the solubility of an alkaline component. Several drops of a PH indicator solution placed on the surface of samples showed varying times for completion of a color change at PH 9–10. Unglazed surfaces and waxy surfaces yield alkaline hydrolysis products immediately. Standard samples (sand only) take a few seconds for the color change to appear. The presence of Al$_2$O$_3$ delays the reaction by several orders of magnitude. In fact, diffusion of ions from imperfections in the surface usually obscures the true time for color change.

Alumina-Sand Mixtures

With sand as the only added component in my magnesia based cement mixtures, the quality of the samples increases as the weight of sand is increased while maintaining constant amounts of all other components. The maximum ratio TABLE 4.—PARTIAL SUBSTITUTION IN SAND-MgO FORMULA

| | Batch Composition, grams | | | | | | |
|---|---|---|---|---|---|---|---|
| | H₂O | APS | ODP | Sand | MgO | Additive | Results [1] |
| Test No.: | | | | | | | |
| 212-1 | 30 | 7.5 | 6 | 85 | 60 | 5 gm. Flint | No improvement. |
| 214-1 | 30 | 7.5 | 6 | 85 | 60 | 5 gm. Al₂O₃ | Some improvement. |
| 214-2 | 30 | 7.5 | 6 | 80 | 60 | 10 gm. Al₂O₃ | Do. |
| 215-1 | 50 | 12.5 | 7.5 | 140 | 100 | 10 gm. Al₂O₃ | Do. |
| 228-1 | 30 | 7.5 | 4.5 | 85 | 60 | 5 gm. Clay | No improvement. |
| 301-1 | 30 | 7.5 | 4.5 | 85 | 60 | 5 gm. CaCO₃ | Do. |
| 303-1 | 30 | 5 | 4.5 | 90 | 60 | 2.5 gm. K₂S₂O₈ | Do. |
| 311-1 | 30 | 7.5 | 4.5 | 85 | 60 | 0.5 gm. Cab-O-Sil | Do. |

[1] Based on relative times for color change of phenolphthalein indicator.

TABLE 5.—MgO, Al₂O₃—SAND MIXTURES

| | Solids Composition, percent | | | Leach resistance |
|---|---|---|---|---|
| | Al₂O₃ | Sand | MgO | |
| Test No.: | | | | |
| 1-30-D | 0 | 60 | 40 | Poor. |
| 2-14-2 | 6.7 | 53.3 | 40 | Good. |
| 1-15-1 | 4.0 | 56 | 40 | Do. |
| 3-20-1 | 0 | 50 | 50 | Poor. |
| 3-26-1 | 4 | 48 | 48 | Good. |
| 3-26-2 | 10 | 45 | 45 | Do. |
| 4-11-1 | 10 | 30 | 60 | Poor. |
| 4-16-1 | 10 | 40 | 50 | Do. |
| 4-19-1 | 15 | 40 | 45 | Good. |
| 4-25-1 | 15 | 35 | 50 | Do. |
| 5-22-1 | 17.1 | 25.6 | 57.3 | Very good. |
| 5-23-1 | 18.2 | 27.4 | 54.5 | Do. |
| 5-28-1 | 20 | 30 | 50 | Do. |
| 4-10-1 | 20 | 20 | 60 | Poor. |
| 3-06-1 | 23.8 | 31.7 | 44.5 | Excellent. |
| 3-10-1 | 25 | 25 | 50 | Do. |
| 4-09-1 | 33 | 0 | 67 | Poor. |
| 10-07-1 | 12.7 | 44.5 | 42.8 | Good. | of sand to magnesia is about 3:2 for the particular materials used. Higher ratios are too viscous to mix with the type of equipment applied in the study. As the ratio is decreased and the slurry becomes more fluid, the reaction temperature increases and gaseous products are released.

Mixtures near the 3:2 sand-MgO ratio are workable with up to 5 percent of Al₂O₃ added and, as previously noted, some increase in resistance to hydrolysis is apparent. The leach resistance and wet strength become progressively better as larger amounts of alumina are substituted for sand as indicated by Table 5. The slurry remains workable by propeller stirring up to a composition of about 20 percent alumina, 25 percent sand, and 55 percent MgO. Cured samples of this composition have very smooth, water resistant surfaces and represent the best compromise between workability and water resistance obtainable with the materials and equipment presently used.

Viscosity can be modified by controlling the particle size of the raw materials. For a given ratio of alumina to magnesia, washed or air elutriated sand can be used to prevent a viscosity increase with increased sand content. There is an increase in clarity due to the absence of fines, and the water resistance is retained, but the surfaces are generally not as smooth. At the same alumina to magnesia ratio, the slurry can be thickened with smaller amounts of ground or crushed sand. The resulting samples have a more uniform texture, but the surface is waxy rather than vitreous appearing. The addition of colloidal silica also produces a waxy surface. Color change of a PH indicator is extremely rapid for the non-vitreous surfaces.

Increasing the Al₂O₃ content to 25 percent yielded very stiff mixtures which overheated while curing. Those portions of the surface which remained intact were the hardest and most glassy of any composition tested. Complete exploration of the high alumina portion of the three component (MgO-Al₂O₃-sand) system which leads to formation of the vitreous, water resistant compounds depends on a phenomological study of raw materials and processing equipment. Progress would be materially speeded by analytical evaluation of the products and reactions involved.

ELECTRICAL PHENOMENA

The effect of the passage of an electrical current through the cement slurry shows that the transition from an opaque crystalline form to an amorphous or glassy state is promoted by (1) inducing a flow of electrons through the slurry using internally generated E. M. F. or, (2) applying an external voltage across a sample during the cure step.

SUMMARY

A liquid phase consisting of an aqueous solution of ammonium persulfate and a glycol ether can be processed with a solids mixture of magnesium oxide, aluminum oxide, and sand to yield a heat curing cement having a dense vitreous appearing surface. Electrical phenomena are important but not fully understood.

Having thus described my invention, What I claim is:
1. The method of molding a magnesium oxide product which comprises
    preparing a liquid phase consisting of an aqueous solution of ammonium persulfate and a substance selected from the group consisting of glycol and glycol ether the latter substance being in an amount of 10 percent and the ammonium persulfate being in an amount of 18 percent by weight;
    adding a fine aggregate and calcined magnesia to the liquid phase while stirring to form a slurry with the magnesia to water being in a ratio of 2:1; and
    casting the slurry in a suitable mold.
2. The method according to claim 1 in which the liquid phase consists of 72 percent water, 10 percent of a substance selected from the group consisting of oxidipropanol and oxydiethanol and 18 percent ammonium persulfate by weight.
3. The method according to claim 8 in which the slurry contains calcined magnesia to water in a ratio at 2:1 by weight.
4. The method of claim 3 in which the cast product is treated at an elevated temperature for a suitable period to cure to a water content of about 0.9 moles of water per mole of magnesia.
5. The method according to claim 3 in which the slurry contains up to about 20 percent alumina, 25 percent sand and 55 percent MgO.

* * * * *